(12) United States Patent
Kudo et al.

(10) Patent No.: US 7,180,474 B2
(45) Date of Patent: Feb. 20, 2007

(54) DISPLAY APPARATUS

(75) Inventors: Yasuyuki Kudo, Fujisawa (JP); Toshimitsu Matsudo, Tokyo (JP); Kazuo Okado, Kokubunji (JP); Hiroki Aizawa, Chigasaki (JP)

(73) Assignees: Hitachi, Ltd., Tokyo (JP); Hitachi Displays, Ltd., Mobara (JP)

( * ) Notice: Subject to any disclaimer, the term of this patent is extended or adjusted under 35 U.S.C. 154(b) by 559 days.

(21) Appl. No.: 10/772,401

(22) Filed: Feb. 6, 2004

(65) Prior Publication Data

US 2004/0222943 A1    Nov. 11, 2004

(30) Foreign Application Priority Data

Feb. 7, 2003  (JP) .............................. 2003-030282

(51) Int. Cl.
*G06F 1/16* (2006.01)
(52) U.S. Cl. .................. 345/1.1; 345/99; 345/214; 345/905; 248/917; 248/918; 312/265.6; 361/681
(58) Field of Classification Search ................. 345/1.1, 345/98, 99, 103, 169, 212, 213, 214, 905; 248/917, 918; 312/256.6; 361/681
See application file for complete search history.

(56) References Cited

U.S. PATENT DOCUMENTS

| 5,537,128 A | * | 7/1996 | Keene et al. ................. 345/89 |
| 5,670,970 A | | 9/1997 | Yamazaki ...................... 345/8 |
| 6,396,469 B1 | | 5/2002 | Miwa et al. ................... 345/87 |
| 6,496,174 B2 | * | 12/2002 | Kurumisawa et al. ........ 345/98 |
| 6,643,124 B1 | * | 11/2003 | Wilk .......................... 361/681 |
| 2001/0052887 A1 | | 12/2001 | Tsutsui et al. ................ 345/87 |
| 2002/0183099 A1 | * | 12/2002 | Lee ............................ 455/566 |

\* cited by examiner

*Primary Examiner*—Bipin Shalwala
*Assistant Examiner*—Vincent E. Kovalick
(74) *Attorney, Agent, or Firm*—Antonelli, Terry, Stout and Kraus, LLP.

(57) ABSTRACT

A display apparatus includes a data driver that is common to a main screen and a sub screen, and the data driver applies, to the main screen, a tone voltage corresponding to display data from a CPU, and during a vertical blanking time-period of the main screen, the data driver applies, to the sub screen, a tone voltage corresponding to black data or white data, and also includes a scan driver scans the main screen and scans the sub screen during the vertical blanking time-period of the main screen.

11 Claims, 12 Drawing Sheets

FIG. 4

| CONTROL-REGISTER ADDRESS[HEX] | 16-BIT DATA | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| 10h | * | * | * | * | * | * | * | * | * | * | * | * | * | * | * | DS |
| 11h | SL7 | SL6 | SL5 | SL4 | SL3 | SL2 | SL1 | SL0 | ML7 | ML6 | ML5 | ML4 | ML3 | ML2 | ML1 | ML0 |
| 12h | 0 | 1 | 1 | 0 | 0 | 0 | 0 | 0 | 1 | 0 | 1 | 1 | 0 | 0 | 0 | 0 |
| 13h | * | * | * | * | * | * | * | * | BL7 | BL6 | BL5 | BL4 | BL3 | BL2 | BL1 | BL0 |
| | * | * | * | * | * | * | * | * | 0 | 0 | 0 | 0 | 0 | 1 | 0 | 0 |

DS: SIGNAL FOR INDICATING DISPLAYED STATE
ML: SIGNAL FOR INDICATING NUMBER OF MAIN-SCREEN DRIVING-LINES
SL: SIGNAL FOR INDICATING NUMBER OF SUB-SCREEN DRIVING-LINES
BL: SIGNAL FOR INDICATING NUMBER OF VERTICAL BLANKING TIME-PERIOD DRIVING-LINES

*: UNSET DATA

| SET VALUE | DS | |
|---|---|---|
| | 0 | 1 |
| OPERATION OF DRIVERS | MAIN-SCREEN DISPLAY OPERATION (SUB-SCREEN NON-DISPLAY OPERATION) | SUB-SCREEN DISPLAY OPERATION (MAIN-SCREEN NON-DISPLAY OPERATION) |

DISPLAY APPARATUS

BACKGROUND OF THE INVENTION

1. Field of the Invention

The present invention relates to a display apparatus having a plurality of display panels (i.e., a plurality of display areas).

2. Description of the Related Art

As the conventional technologies, in U.S. patent application Publication No. 2001/0052887(JP-A-2001-356746), a partial display has been described, which performs a display in a partial area on the display panel. Namely, in U.S. patent application Publication No. 2001/0052887, when a partial display instruction is issued in the driving of a display apparatus such as a liquid-crystal display apparatus equipped with pixels of an n-row×m-column matrix, the partial display is performed, as follows: During one frame time-period, the respective rows of a settable s-row×m-column partial display area are sequentially selected out of the n-row×m-column matrix, then writing predetermined partial display data into the respective rows. Moreover, predetermined background display data such as off-display (i.e., white-display) data is written into a background area which is the remainder of the partial display area. At this time, only a k-row×m-column background area is selected during the one frame time-period, then writing the background display data therein. The k rows to be selected are shift-processed on each frame basis, and the entire background area is selected once during the time-period of (n-s)/k frames. The writing-in of the background display data is performed in such a manner that the polarity with respect to a reference voltage is inverted on each predetermined time-period basis. This allows the pixels in the background area to be securely inversion-driven with the off-display data. In U.S. patent application Publication No. 2001/0052887, however, no description has been given concerning the driving of two display panels.

Also, in U.S. Pat. No. 6,396,469 (JP-A-11-109921), a display apparatus has been disclosed, which drives two pixel arrays independently of each other by using different data drivers. Namely, in U.S. Pat. No. 6,396,469, there is provided the following control unit: In order to display an image on the liquid-crystal panel in one time-period within a period during which one image is displayed, the control unit controls a gate-line driving unit so that a gate line will be selected for each of the first and second pixel arrays, and controls the first and second data drivers so that an image signal for displaying the image will be supplied to first and second data-line groups. In addition, in another time-period included within the same period as that of the one time-period and differing from the one time-period, the control unit controls the gate-line driving unit so that the gate line will be selected again for each of the first and second pixel arrays, and controls the first and second data drivers so that a non-image signal, which has a predetermined electric potential and differs from the image signal, will be supplied to the first and second data-line groups. In U.S. Pat. No. 6,396,469, however, no description has been given concerning the driving of the two pixel arrays by using the one data driver.

Also, in U.S. Pat. No. 5,670,970 (JP-A-07-175448), the disclosure has been made regarding the driving of two liquid-crystal panels by using one driver. Namely, in U.S. Pat. No. 5,670,970, there are provided the XY-matrix-type first and second liquid-crystal panels which have a switching element and a storage element on each pixel basis, and a liquid-crystal driving apparatus. Here, this liquid-crystal driving apparatus supplies the first and second liquid-crystal panels with an image signal whose polarity is inverted on each predetermined period basis, so that polarities of the image signals simultaneously supplied to the first and second liquid-crystal panels will become mutually opposite polarities. In U.S. Pat. No. 5,670,970, however, no description has been given concerning the feeding of different image signals to the two liquid-crystal panels.

SUMMARY OF THE INVENTION

It is an object of the present invention to provide a display apparatus which is capable of driving a plurality of display panels independently of each other by using a common circuit common thereto, and further, which is capable of reducing the power consumption.

In the present invention, a data driver is configured to be able to apply a tone voltage corresponding to both display data on a main screen and display data on a sub screen, and a scan driver is configured to be able to drive both a driving line for the main screen and a driving line for the sub screen. This configuration results in the implementation of a configuration that the single data driver and the single scan driver allow the two screens to be driven as if one screen were driven.

Moreover, in the present invention, if either of the two screens is set on non-display, a display synchronization signal for only a screen to be displayed (e.g., main screen) is accepted. In addition, during a vertical blanking time-period of the display synchronization signal, the non-displayed screen (e.g., sub screen) is scanned.

According to the present invention, of the plurality of display panels, the scanning period of a display panel set in the non-displayed state becomes smaller. This makes it possible to reduce the power consumption.

According to the present invention, a part or the whole of a tone-voltage generating circuit is stopped when none of the display panels is scanned. This makes it possible to reduce the power consumption.

Other objects, features and advantages of the invention will become apparent from the following description of the embodiments of the invention taken in conjunction with the accompanying drawings.

BRIEF DESCRIPTION OF THE DRAWINGS

FIG. 4 illustrates contents of a control register 312 in the first embodiment of the present invention;

DETAILED DESCRIPTION OF THE INVENTION

Referring to FIG. 1 to FIG. 9, the explanation will be given below concerning the configuration of a display apparatus in a first embodiment of the present invention.

Figure 1A:
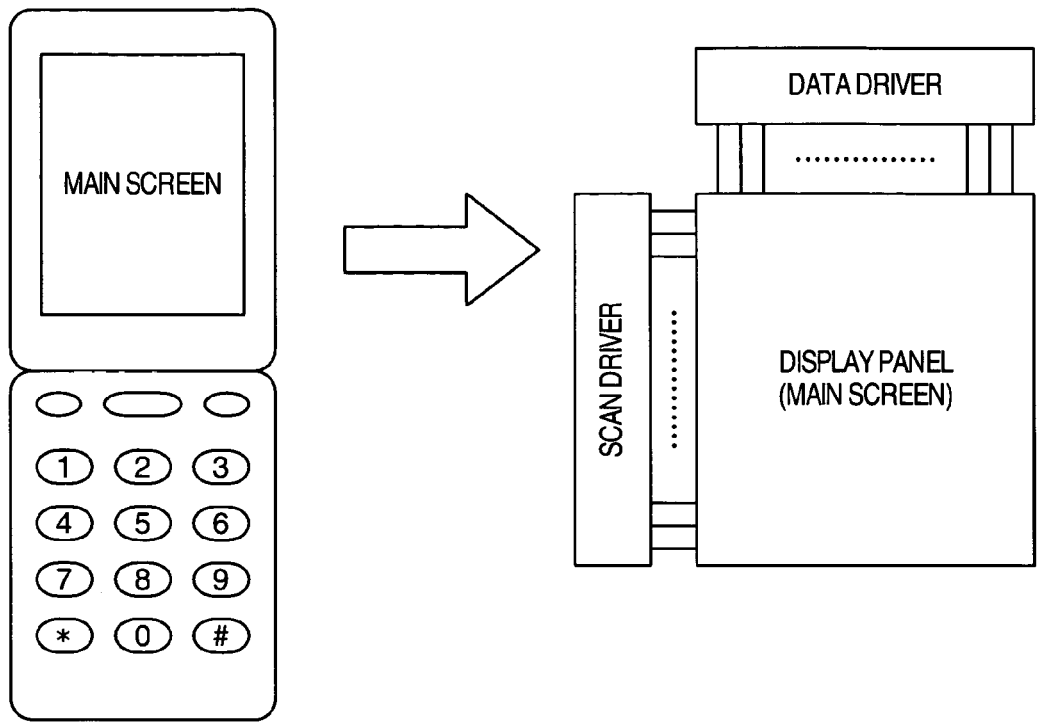
FIG. 1A and FIG. 1B illustrate overviews of a folded-type mobile telephone having two screens of the present invention.
Figure 1B:
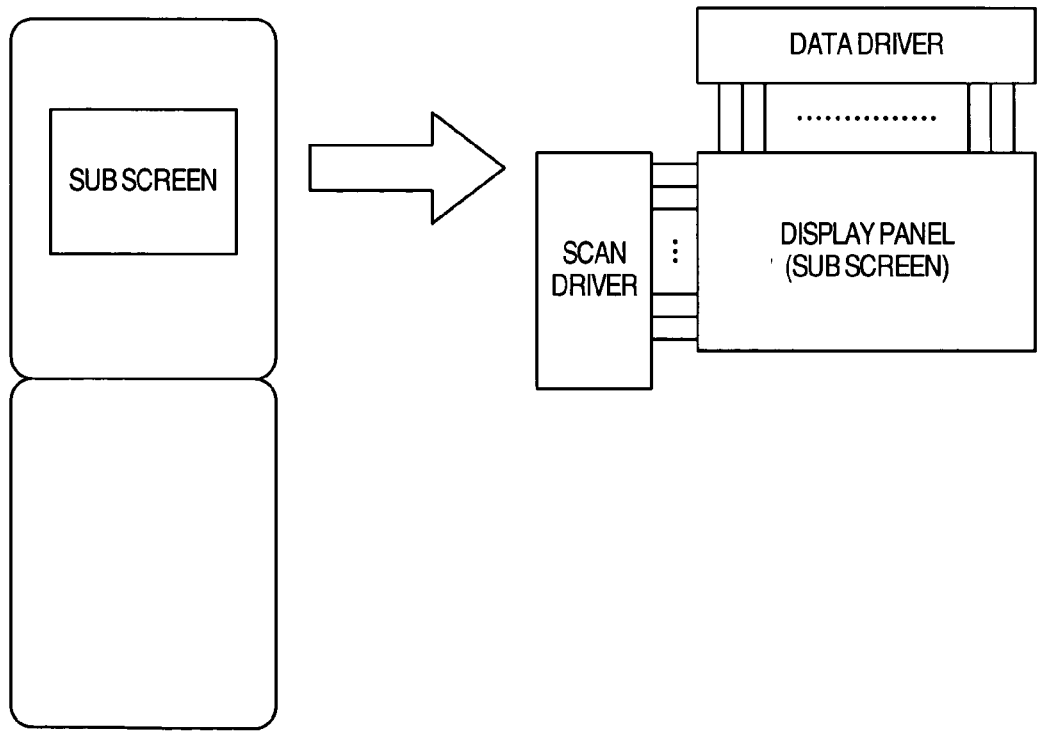

FIG. 1A and FIG. 1B illustrate overviews of a folded-type mobile telephone using two screens. The mobile telephone uses the following two screens: A main screen (i.e., inner-side large screen) as illustrated in FIG. 1A for performing telephone-number and character inputs, respective types of mobile-telephone settings, and the like, and, a sub screen (i.e., outer-side small screen) as illustrated in FIG. 1B for displaying information in a state as well where the mobile telephone is folded. Here, in order to reduce the power consumption of the two-screen-used mobile telephone down to the lowest possible degree, its displayed state is controlled as follows: The sub screen is set on non-display when the main screen is used, whereas, in the reception-awaiting state (i.e., the state of being folded), the display is performed on the sub screen and the main screen is set on non-display. Moreover, a data driver for driving the main screen and a data driver for driving the sub screen are identical and are common to the two screens (i.e., a common LSI). Meanwhile, a scan driver for driving the main screen and a scan driver for driving the sub screen are different from each other (i.e., different LSIs).

Figure 2A:
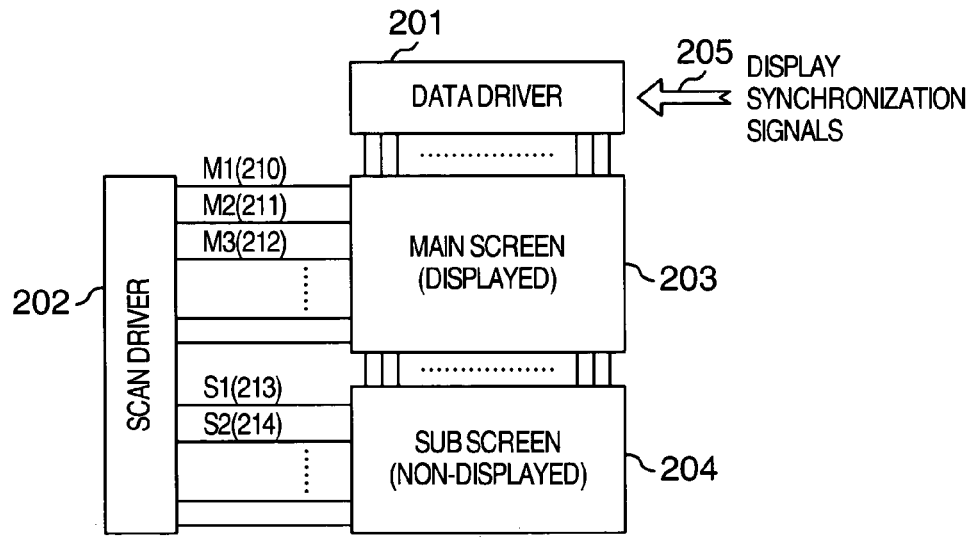
FIG. 2A and FIG. 2B illustrate an overview of a display apparatus having two screens of the present invention, and operation signals of the display apparatus.
Figure 2B:
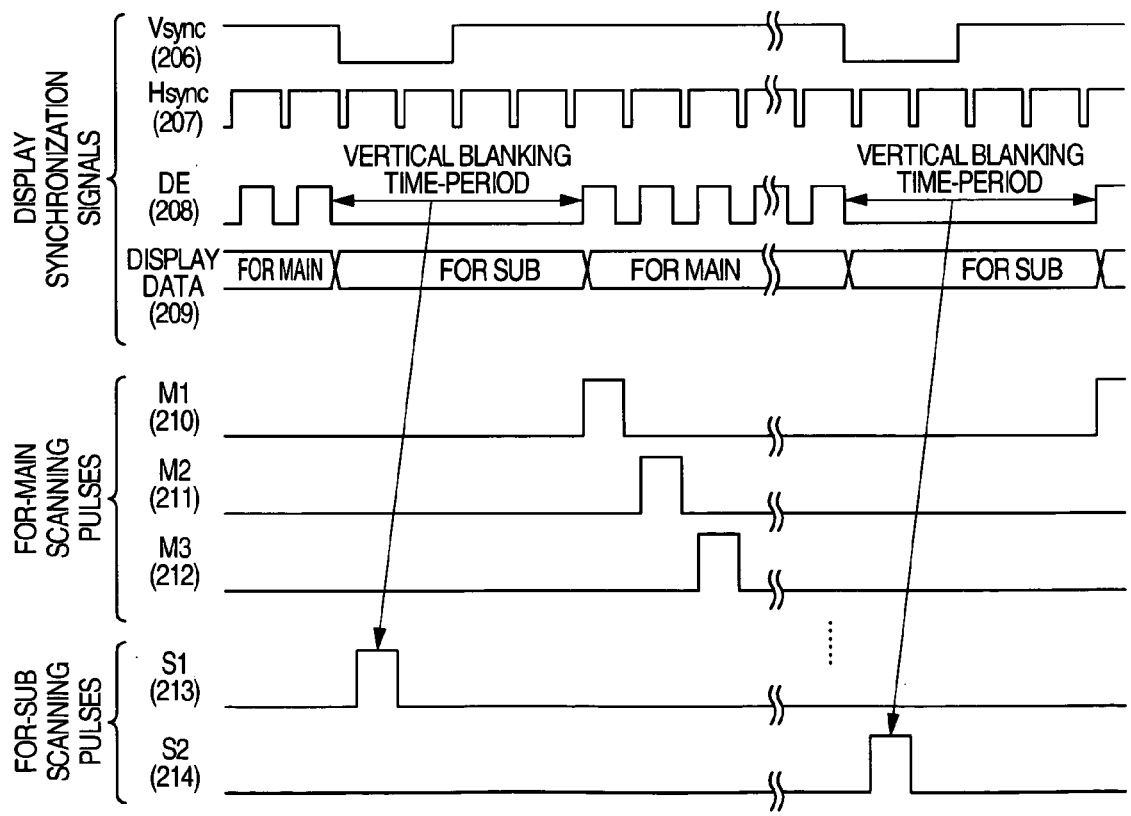

Referring to FIG. 2A and FIG. 2B, the explanation will be given below regarding the operation outline of the present embodiment. In FIG. 2A, reference numerals 201, 202, 203 and 204 denote the data driver, the scan driver, the main screen and the sub screen, respectively. TFT (: Thin Film Transistor) liquid crystal is used as both screens. Here, data lines for the main screen 203 and data lines for the sub screen 204 are configured to be identical and are common to the two screens, and the scan driver 202 is configured to be able to drive both a driving line for the main screen 203 and a driving line for the sub screen 204. This configuration, accordingly, allows the above-described one set of drivers to drive the two screens.

Next, in FIG. 2B, if it is assumed that the main screen 203 is in the displayed state and the sub screen 204 is in the non-displayed state, display synchronization signals and display data 205 which are necessary for causing the main screen 203 to perform an image display are transferred from the outside. The detailed items of the display synchronization signals and display data 205 are as follows: A vertical synchronization signal (hereinafter, referred to as "Vsync"), a horizontal synchronization signal (hereinafter, referred to as "Hsync"), a data-enable signal (hereinafter, referred to as "DE"), and a dot clock signal (hereinafter, referred to as "CLK"). Reference numerals 206 to 208 denote the above-described signals' waveforms (incidentally, here, no waveform is illustrated for the signal waveform of CLK). Vsync 206 is a vertical synchronization signal for indicating one frame time-period (i.e., time-period for displaying one picture), and its frequency is set to be 60 Hz in the present embodiment. Hsync 207 is a horizontal synchronization signal for indicating one scanning time-period. DE 208 is a data-enable signal, and the display data becomes effective when this data-enable signal is "HIGH". Here, this DE signal 208 becomes "LOW" for the time-period of several lines one time during the one frame time-period. This several-line time-period is referred to as "vertical blanking time-period". Meanwhile, concerning the display data 209, display data for the sub screen which is in the non-displayed state is transferred during the above-described vertical blanking time-periods, and display data for the main screen is transferred during time-periods other than the vertical blanking time-periods. Here, the display data for the main screen includes color information of, e.g., 16 bits (red: 5 bits, green: 6 bits, blue: 5 bits) per pixel. As the display data for the non-displayed sub screen, fixed data is selected which permits the power consumption of the sub screen to become its minimum. In the present embodiment, black data (i.e., the display data for red, the one for green, and the one for blue are 0 all) is selected and transferred as the fixed data.

Next, the explanation will be given below concerning driving timings of the respective screens. Numerals 210, 211, and 212 denote a scanning pulse for driving a first line of the main screen 203, a scanning pulse for driving a second line thereof, and a scanning pulse for driving a third line thereof, respectively. Since the main screen 203 is in the displayed state, the scanning pulses are applied thereto sequentially on one scanning time-period basis in this way. On the other hand, since the sub screen 204 is in the non-displayed state, there exists no necessity for applying scanning pulses thereto sequentially on one scanning time-period basis. In the case of using the liquid-crystal display apparatus or the like, however, continuing to apply the direct-current components thereto degrades the liquid crystal because of the characteristics of the liquid crystal. This condition requires that the scanning pulses be applied thereto even in the non-displayed state so as to perform the alternating-current driving. Consequently, it is advisable that, as illustrated in FIG. 2B, the scanning pulses be generated during the vertical blanking time-periods of the main screen 203, and that lines of the non-displayed sub screen 204 be driven sequentially on each vertical blanking time-period basis of the main screen. Here, numerals 213 and 214 denote the scanning pulse for driving the first line of the sub screen 204 and the scanning pulse for driving the second line thereof, respectively. Both of the scanning pulses are generated during the vertical blanking time-periods of the main screen 203.

From the above-described explanation, the operation frequency of the scanning pulses on the main screen 203 becomes equal to the above-described frame frequency=60 Hz. On the other hand, on the sub screen 204, each line of the sub screen is scanned during the vertical blanking time-period of the main screen 203. As a result, the operation frequency of the scanning pulses becomes equal to 1/60 Hz. This condition allows the non-displayed sub screen to be driven with the low frequency, thereby making it possible to implement the low power consumption. Incidentally, during the vertical blanking time-periods of the main screen, the main screen is also in the non-displayed state.

Next, the description will be given below regarding a detailed unit for performing the above-described low power-consumption driving according to the present invention.

Figure 3:
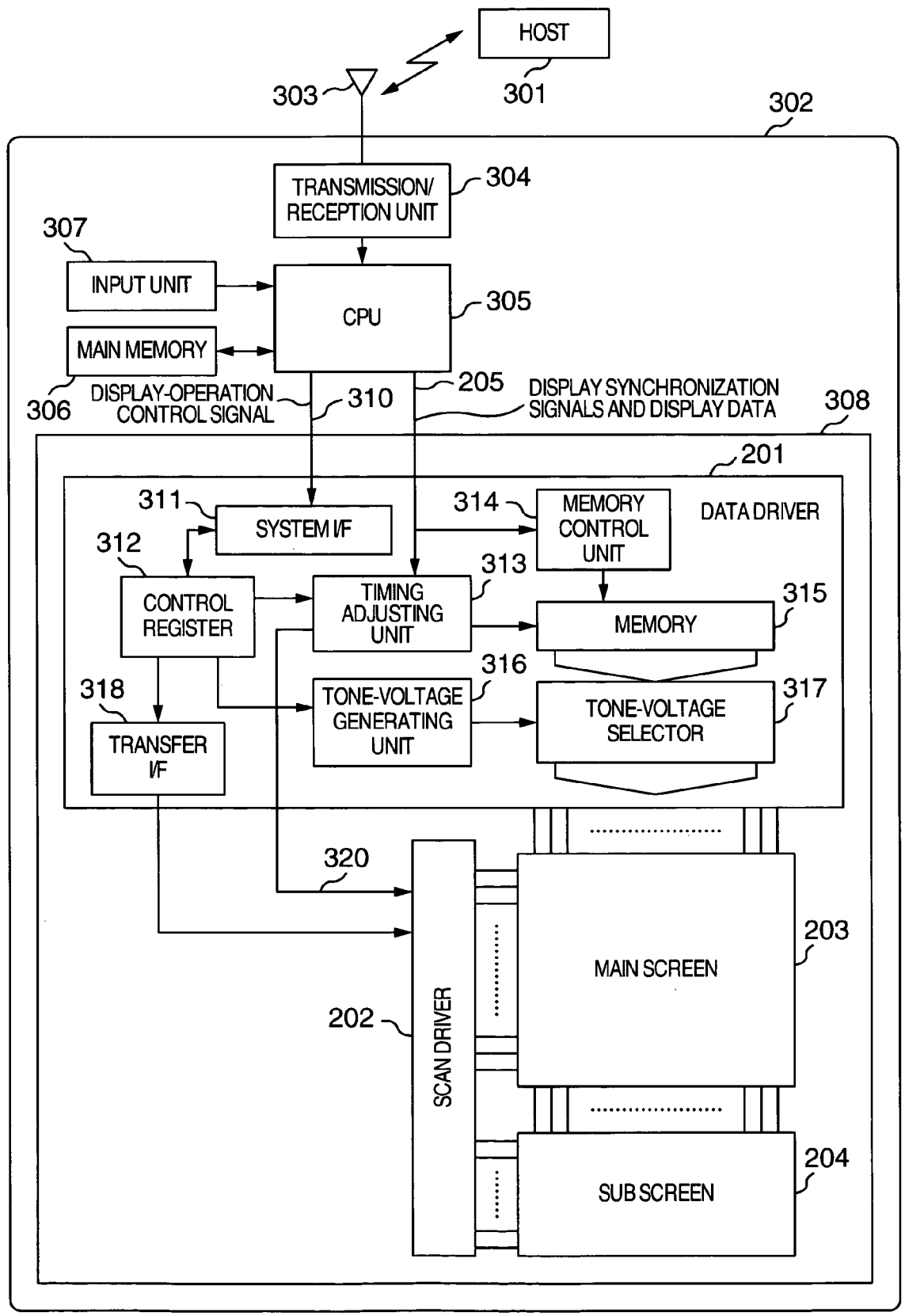
FIG. 3 illustrates a circuit configuration of the display apparatus in a first embodiment of the present invention.

FIG. 3 illustrates a configuration diagram in the case where the display apparatus of the present invention is applied to a mobile telephone. In FIG. 3, numerals 301 and 302 denote a host station and the mobile telephone, respectively. The basic configuration blocks of the mobile telephone 302 are an antenna 303, a transmission/reception unit 304, a CPU 305, a main memory 306, an input unit 307 and a display unit 308. Also, the basic configuration blocks of the display unit 308 are the data driver 201, the scan driver 202, the main screen 203 and the sub screen 204. Furthermore, the data driver 201 includes a system interface 311, a volatile control register 312, a timing adjusting unit 313, a memory control unit 314, a memory 315, a tone-voltage generating unit 316, a tone-voltage selector 317 and a scan driver interface 318. Additionally, here, there may be provided three or more screens.

At first, the CPU 305 inside the mobile telephone 302 is an LSI for performing the respective types of operation controls over the mobile telephone. Regarding the screen control, the CPU 305 outputs the display synchronization signals and display data 205 so that received information from the host 301, or image data stored in advance into the main memory 306 can be displayed on the screens. Here, the display synchronization signals and display data 205 are prepared in the two types, i.e., the display synchronization signals and display data 205 for the main screen 203 and the one 205 for the sub screen 204. For example, the one 205 for the main screen 203 is outputted in the state where the mobile telephone is opened, and the one 205 for the sub screen 204 is outputted in the state where the mobile telephone is folded. This operation can be implemented as follows, for example: There is provided a switch which is turned ON in the state of being folded. Then, the CPU 305 judges the state of this signal, and, depending on this judgment result, selects the output. Also, in addition to the above-described display synchronization signals and display data 205, the CPU 305 outputs a display-operation control signal 310 for controlling the inner operation of the data driver 201 and that of the scan driver 202. The details of signal timings or the like in the system interface will be omitted, since the description thereabout has been given in the above-described publications. Additionally, the outline of the operation lies in the following point: Instructions (i.e., data in the display-operation control signal 310) are issued from the CPU, and this data is stored into the control register 312 inside the driver, thereby determining the operation inside the driver.

Figure 5:
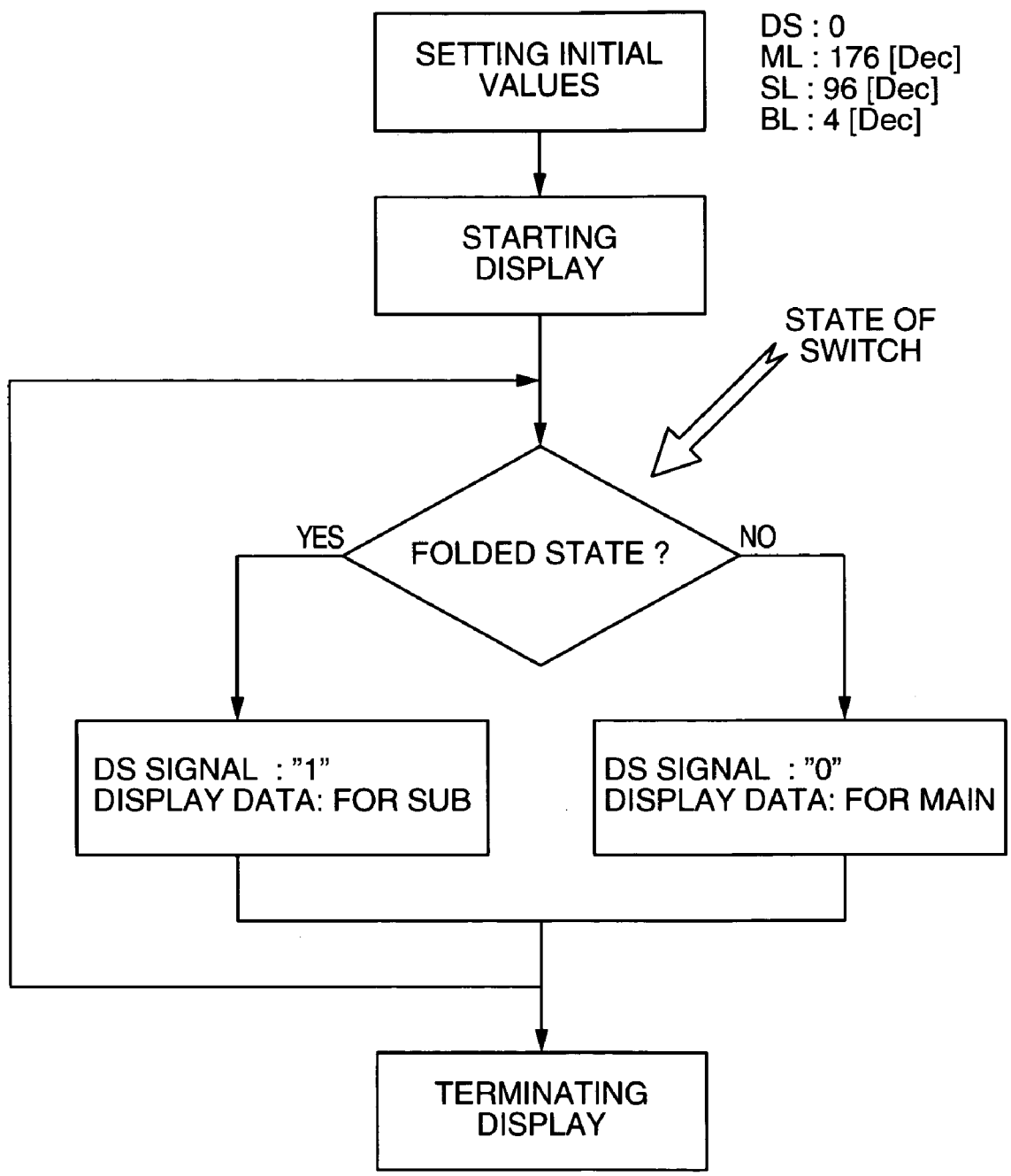
FIG. 5 illustrates an issuing sequence of instructions in the first embodiment of the present invention.

Here, in order to implement the two-screen driving method, i.e., the characteristic of the present invention, in addition to the instructions described in the above-described publications, the following four types of instructions are further added thereto in the present embodiment: The line number of the main screen 203 (hereinafter, referred to as "ML"), the line number of the sub screen 204 (hereinafter, referred to as "SL"), the line number of the vertical blanking time-period (hereinafter, referred to as "BL"), and information as to which of the screens is to be set into the displayed state (hereinafter, referred to as "DS"). FIG. 4 illustrates an example of indicating into which address of the control register 312 the above-described instructions are to be stored. Incidentally, in FIG. 4, the indication has been given such that ML=176 [decimal number], SL=96 [decimal number], BL=4 [decimal number], and DS=0 [binary number]. This is an example for making the later-described explanation easy to understand. Next, as illustrated in FIG. 5, the sequence of issuing the above-described instructions to the control register 312 is as follows: At first, at the time of an initial setting before performing the display, the issuing of all the four types of instructions is carried out. After that, with respect to the information as to which of the screens is to be set into the displayed state, and the display synchronization signals and display data 205 which are made compliance with this information, their contents to be transferred are modified whenever the need arises. This modification, as described earlier, can be implemented as follows, for example: There is provided the switch which is turned ON in the state of being folded. Then, the CPU 305 judges the state of this signal, and performs the control. The initial setting is performed for each power-on into the data driver 201.

Next, the explanation will be given below concerning the operation of the data driver 201 and the scan driver 202 after the above-described instructions have been stored into the control register 312.

At first, consider the case where the set value indicated in FIG. 4 has been stored into the control register. Since the DS signal is "0", the above-described operation is set into the main-screen display operation (i.e., sub-screen non-display operation) mode. In this case, the display synchronization signals 205 for the main screen 203 are inputted into the memory control unit 314, and the display data is written at a predetermined address in the memory 315. Here, the addressing method is as follows: In order to cause the address to coincide with a displayed position on the main screen, based on Vsync, the address is reset to the head address. Then, the data is sequentially written in the transverse direction in synchronization with the dot clocks in the time-periods during which the DE signal is "HIGH", and, based on Hsync, the line is returned to the new line. This operation is repeated. Moreover, the "black data" for the non-displayed sub screen, which is transferred in the time-periods during which the DE signal is "LOW", is written into the next line or thereafter to the final line into which the display data for the main-screen displaying operation is written.

Figure 6:
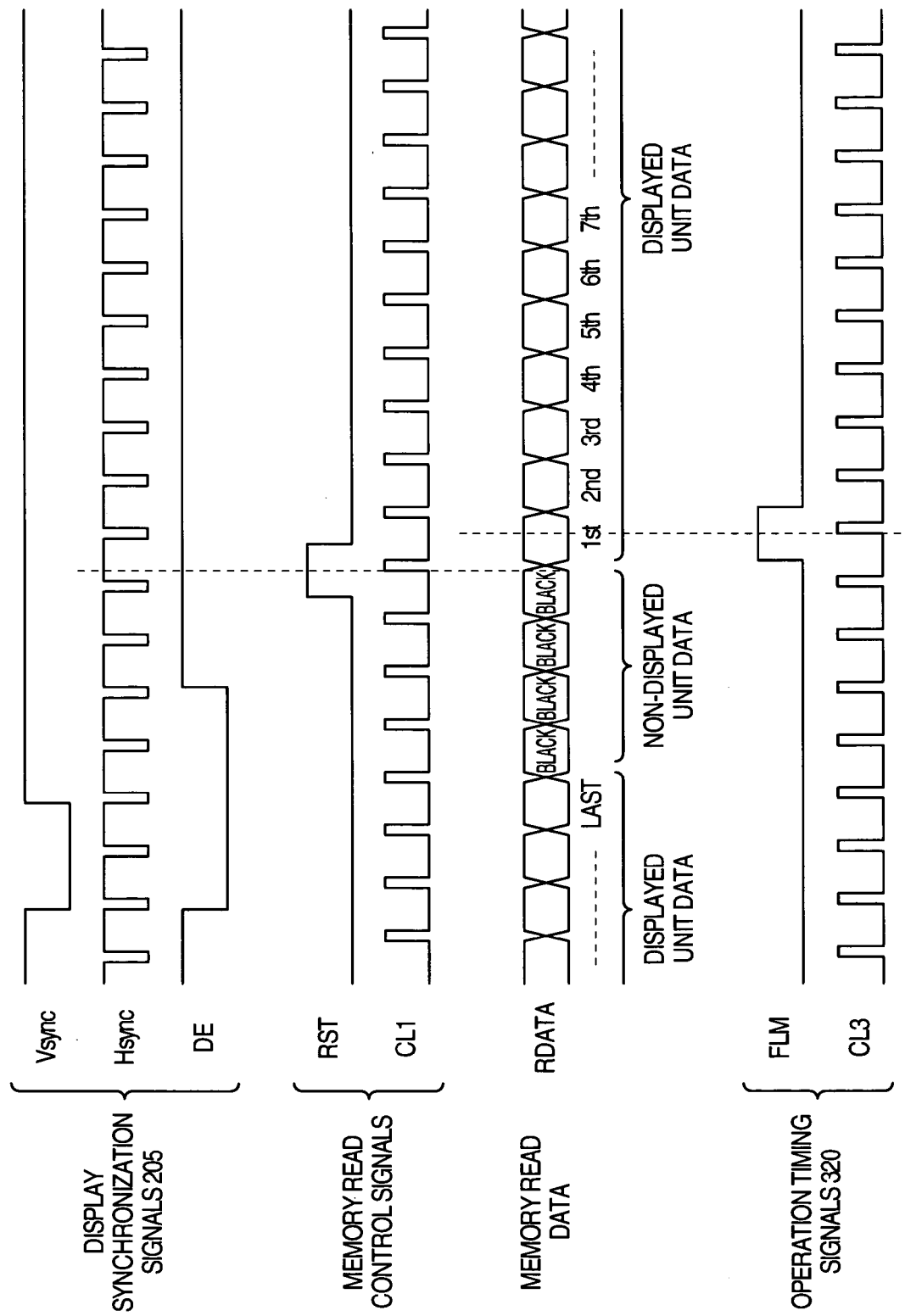
FIG. 6 illustrates operation signals of a timing adjusting unit 313 in the first embodiment of the present invention.

Next, the timing adjusting unit 313 receives the display synchronization signals 205, then generating read control signals for the memory 315 and operation timing signals 320 for the scan driver 202. FIG. 6 illustrates timing charts of these signals. In FIG. 6, notations RST and CL1 denote a reset signal for resetting the address to the head address and a read synchronization signal, respectively. Based on these clocks, read data RDATA are sequentially outputted in unison on one-line amount basis from the memory 315. Next, the detailed items of the operation timing signals 320 are FLM for indicating the head line, and CL3 for indicating output timings of scanning pulses. Incidentally, the above-described signal group can easily be generated from the inputted display synchronization signals 205 by a logic circuit, and accordingly the detailed circuit configuration will be omitted.

The tone-voltage generating circuit 316 is a block for generating tone voltages in a level number corresponding to the display data. For example, the level number in the present embodiment becomes equal to 64 levels, since, as described earlier, there exists the 6-bit green data.

The tone-voltage selector 317, in accordance with RDATA read from the memory 315, selects one level from among the respective tone-voltage levels generated by the tone-voltage generating circuit 316, then outputting the selected one level as the tone voltage.

The operation described so far allows the tone voltages to be outputted in unison and in synchronization with CL1. Moreover, after the output of all the tone voltages for the displayed unit has been terminated, a tone voltage corresponding to the black data is outputted. Furthermore, getting back to the head line gain, this operation is repeated.

The transfer interface 318 is a block for transferring, to the scan driver 202, a part of the data stored in the control register 312. The configuration and operation of the interface 318 are assumed to be in conformity with, e.g., "Common Driver Interface" described in the previously-mentioned Provisional Specification Rev 0.6 "256-color-display-capable RAM-built-in 384-channel segment driver HD66763". The details of signal timings or the like in the common driver interface will be omitted, since the description thereabout has been given in the above-described publication.

Figure 7:
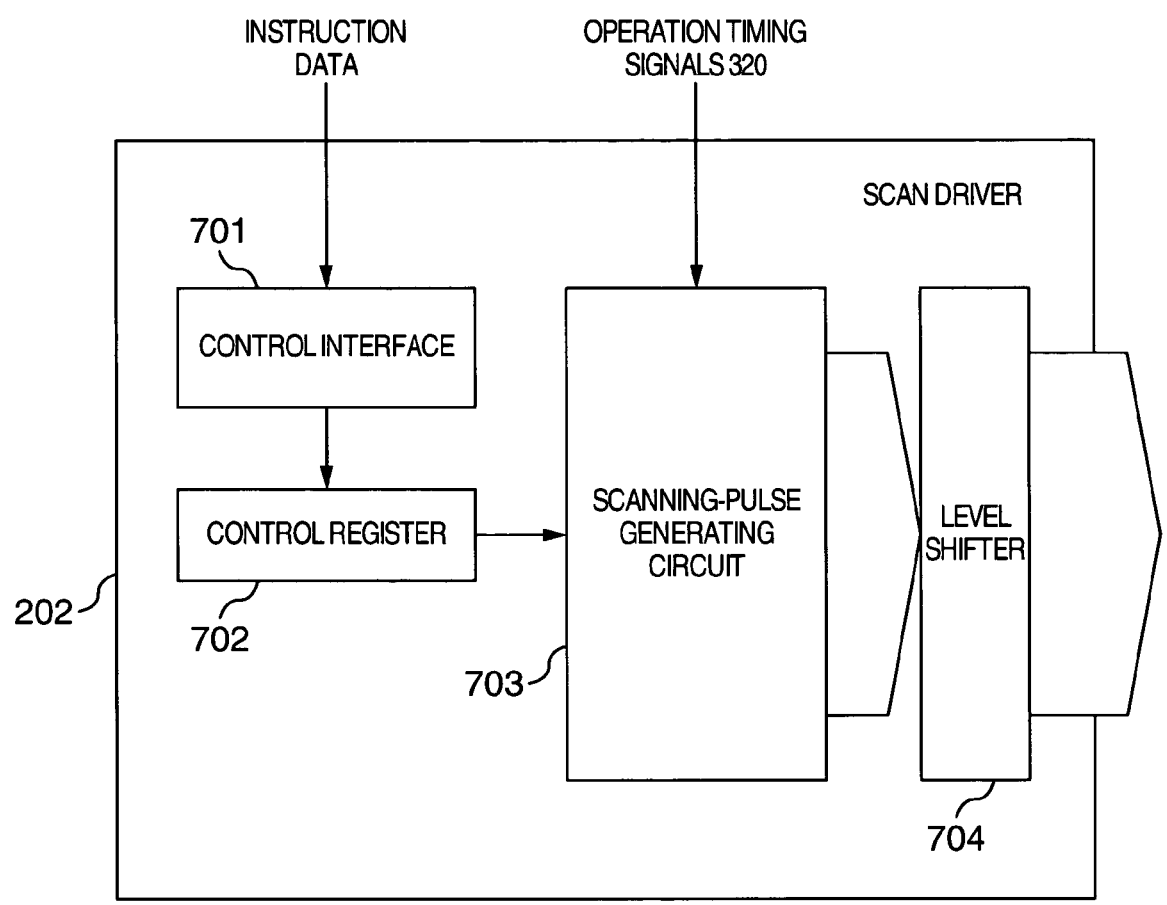
FIG. 7 illustrates a circuit configuration of a scan driver 202 in the first embodiment of the present invention.

Next, referring to FIG. 7, the explanation will be given below regarding the configuration and operation of the scan driver 202. The scan driver 202 includes a control interface 701, a control register 702, a scanning-pulse generating circuit 703 and a level shifter 704.

Figure 8:
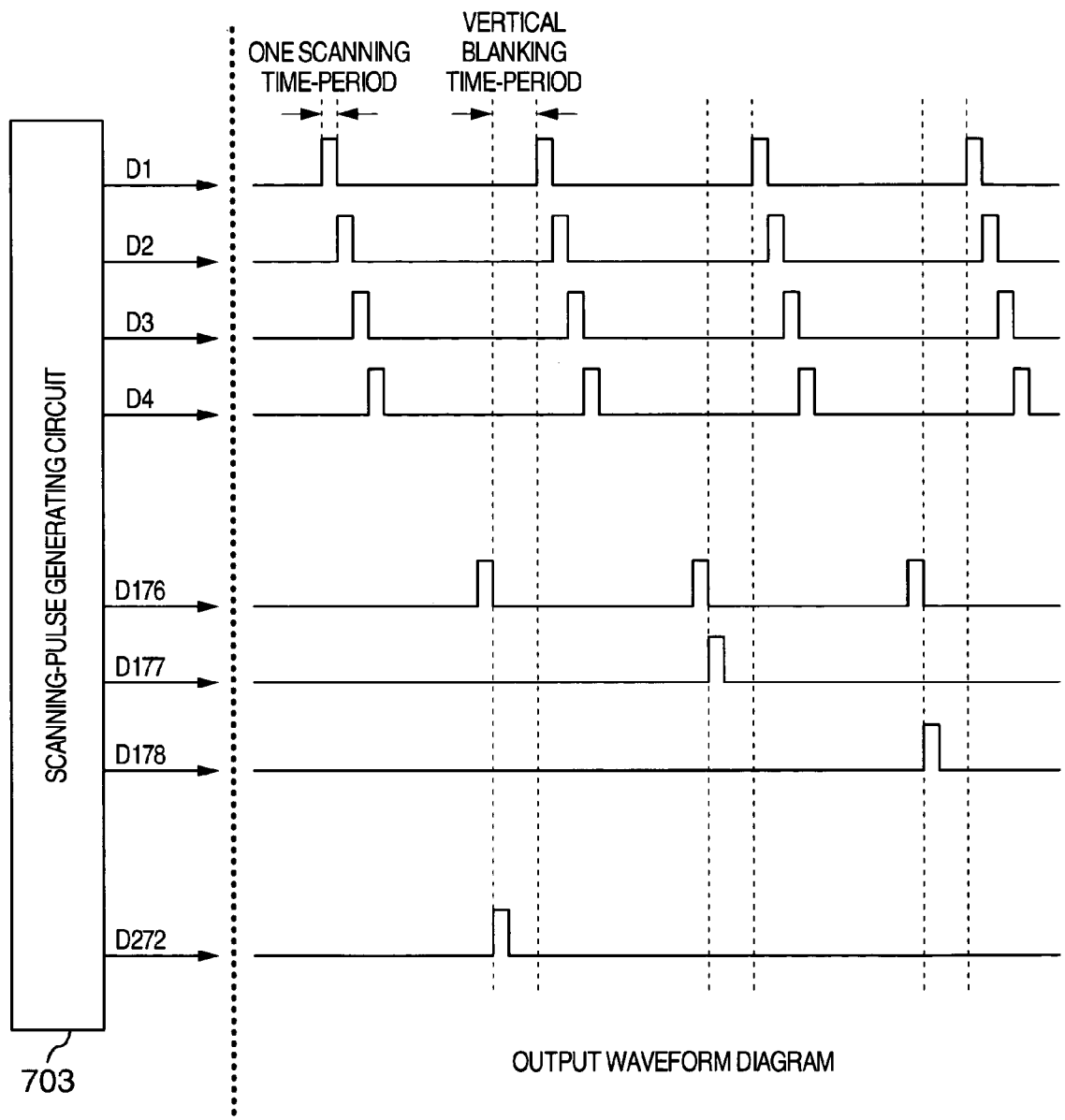
FIG. 8 illustrates operation signals of a scanning-pulse generating circuit 703 in the first embodiment of the present invention.

The control interface 701 performs an operation of receiving instruction data transferred from the transfer interface 318, and of storing the instruction data into the control register 702. Here, the instruction data includes the above-described four types of instructions ML, SL, BL and DS, i.e., the characteristic of the present invention, The scanning-pulse generating circuit 703 is a block for determining to which output terminal and with which timing a scanning pulse is to be outputted. Here, this determination is performed based on the four types of instruction data stored into the control register 702, and the operation timing signals 320 transferred from the timing adjusting unit 313. For example, as described earlier, in-the case where ML=176 [decimal number], SL=96 [decimal number], BL=4 [decimal number] and DS=0 [binary number], as illustrated in FIG. 8, signals D1 to D176 become the ones for the main screen, and pulses occur sequentially on one scanning time-period basis. Moreover, signals D177 to D272 (=176+96) become the ones for the sub screen, and pulses occur sequentially on each vertical blanking time-period basis. Generally speaking, in the case where ML=m and SL=s, signals D1 to Dm become the ones for the main screen, and signals Dm+1 to Dm+s become the ones for the sub screen. Furthermore, if DS=0, the pulses for the main screen 203 occur sequentially on one scanning time-period basis, and the pulses for the sub screen 204 occur sequentially on each vertical blanking time-period basis. If DS=1, on the contrary, the pulses for the main screen 203 occur sequentially on each vertical blanking time-period basis, and the pulses for the sub screen 204 occur sequentially on one scanning time-period basis.

The level shifter 704 level-shifts the D signal group outputted by the scanning-pulse generating circuit 703, then outputting the level-shifted D signal group to the scanning lines of each screen. The criterions of the level-shift are a voltage level at which the TFT is switched ON when a D signal is "HIGH", and a voltage level at which the TFT is switched OFF when the D signal is "LOW".

As having been described so far, in the data driver 201, the tone voltages corresponding to the display data are applied to the main screen 203 which is in the displayed state, and the tone voltages corresponding to the black data are applied to the sub screen 204 which is in the non-displayed state. Meanwhile, in the scan driver 202, the scanning pulses are generated which can drive the main screen 203 on one scanning time-period basis, and the scanning pulses are generated which can drive the sub screen 204 on each vertical blanking time-period basis. Then these scanning pulses are sequentially applied to the respective screens. This allows the non-displayed sub screen to be driven with the low frequency.

Consequently, in the present embodiment, it becomes possible to implement the driving of the two screens, i.e., the main and sub screens, with the low power consumption and without increasing the number and areas of the configuration blocks, the cost and the like.

Incidentally, in the first embodiment of the present invention, the TFT liquid crystal has been used as the screens. The present invention, however, is not limited thereto. Namely, the present invention is applicable to the other types of screens, e.g., an organic EL screen. Also, in the first embodiment of the present invention, the non-displayed sub screen has been driven with the low frequency on each line and vertical blanking time-period basis. The present invention, however, is not limited thereto. Namely, a plurality of lines may be driven simultaneously.

Also, in the first embodiment of the present invention, the black data has been selected for the display of the non-displayed sub screen. The present invention, however, is not limited thereto. For example, if liquid crystal in the normally-white mode is used, applying white data thereto generally results in the lower power consumption.

Namely, not being limited to the black data or the white data, whatever display data is allowable as long as its luminance is relatively low of the plurality of tone voltages. Such low-luminance display data are generically referred to as "blanking data".

Also, the first embodiment of the present invention is easily applicable to the so-called partial display mode.

Also, the display synchronization signals and display data 205 in the first embodiment of the present invention are transferred continuously by the raster scan scheme. Accordingly, the memory 315, which is the configuration block of the data driver 201, does not necessarily store the display synchronization signals and display data 205 by the amount of one picture. Namely, for example, even a buffer by the amount of one line can meet the requirements.

Figure 9:
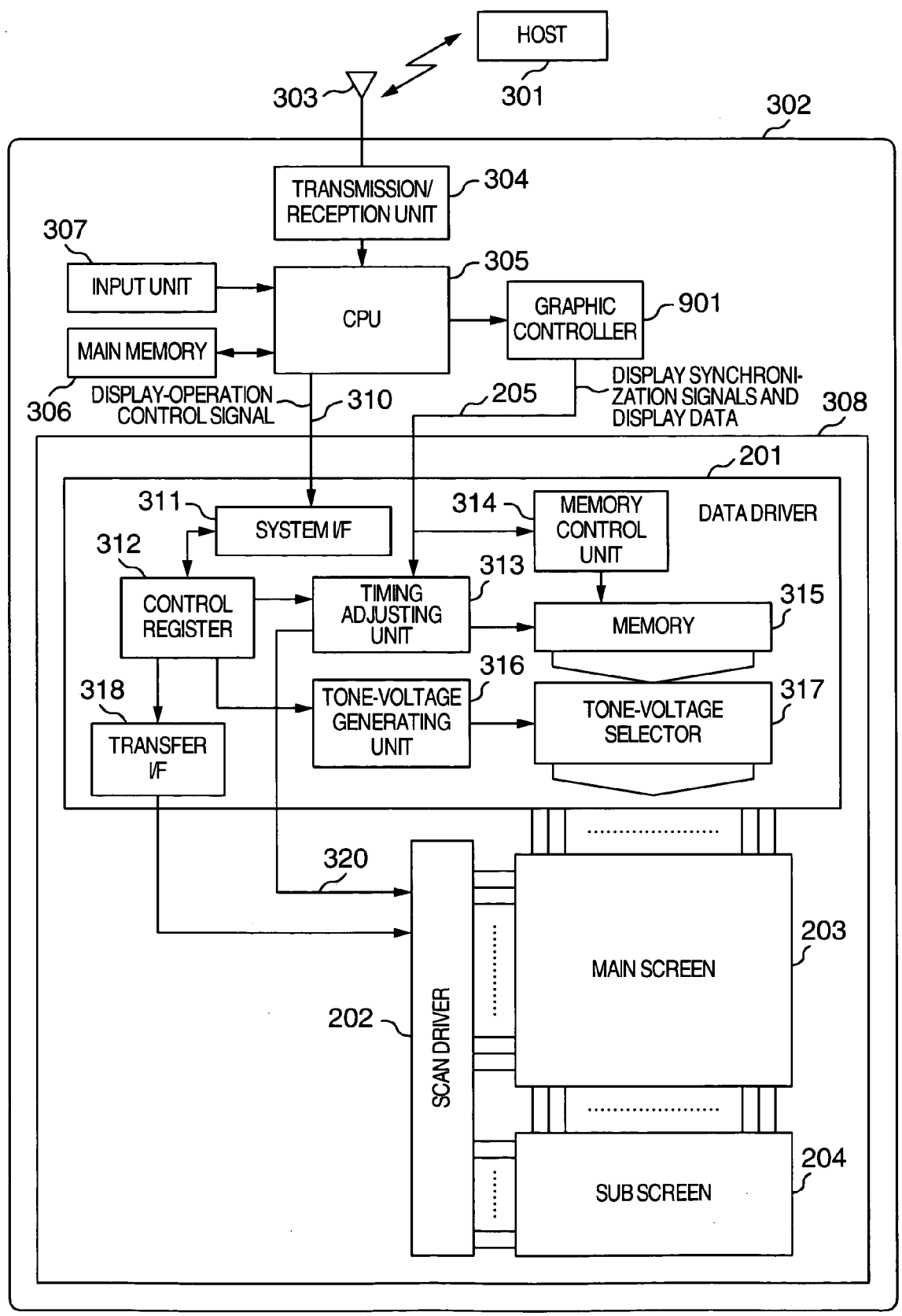
FIG. 9 illustrates another circuit configuration of the display apparatus in the first embodiment of the present invention.

In addition, as illustrated in FIG. 9, the display synchronization signals and display data 205 in the first embodiment of the present invention may also be configured to be generated and transferred by a graphic controller 901. The other configuration blocks are the same as those illustrated in FIG. 3, and accordingly are denoted by the same reference numerals.

Next, referring to FIG. 10 to FIG. 12, the explanation will be given below concerning the display apparatus in a second embodiment of the present invention. In the previously-described first embodiment of the present invention, the driving frequency of the screen which, of the two screens, is in the non-displayed state has been extremely lowered, thereby allowing the implementation of the low power consumption. In the second embodiment of the present invention, in addition to this characteristic, the presentation will be made regarding a method for reducing the power to be consumed at the tone-voltage generating unit. Also, the consideration will be given not only to the case of displaying either of the two screens, but also to the case of displaying the two screens simultaneously.

Hereinafter, referring to a timing chart in FIG. 10, the explanation will be given below concerning the characteristics of the second embodiment of the present invention. In FIG. 10, FLM is a signal for indicating the head line, and CL3 is a signal for indicating output timings of scanning pulses. These signals are the same as those in the first embodiment of the present invention. Power-supply signals are signals for controlling a tone-voltage generating unit. The tone-voltage generating unit is brought into operation when the power-supply signal is "HIGH", and is brought into non-operation when the power-supply signal is "LOW". Tone voltages, which are outputted by a data driver, are at voltage levels corresponding to display data. Notations M1, M2, and M3 denote a scanning pulse for driving a first line of the main screen, a scanning pulse for driving a second line thereof, and a scanning pulse for driving a third line thereof, respectively. Meanwhile, S1 and S2 denote a scanning pulse for driving a first line of the sub screen, and a scanning pulse for driving a second line thereof, respectively.

At first, in the case of the two-screen simultaneous display mode, the power-supply signal is always "HIGH", and the tone voltage for the sub screen is outputted subsequently to the tone voltage for the main screen. Being interrelated therewith, the scanning pulses for the sub screen are also outputted subsequently to the scanning pulses for the main screen sequentially on one scanning time-period basis. Namely, in the two-screen simultaneous display mode, the main screen and the sub screen are driven as if they were one continuous screen. Next, in the main-screen display mode, basically, the power-supply signal becomes "LOW" during display time-periods for the sub screen. However, in the proportion of one time (e.g., the shadow portion in FIG. 10) during a plurality of frame time-periods, the power-supply signal becomes "HIGH" during the display time-periods for the sub screen. At this time, the tone voltage is outputted which is at a voltage level corresponding to display data (e.g., black data) which permits the power consumption to become its minimum. Being interrelated therewith, the scanning pulses for the main screen are outputted on each frame time-period basis. The scanning pulses for the sub screen, however, are outputted in the proportion of one time during the plurality of frame time-periods. Incidentally, in the sub-screen display mode, the above-described relationship becomes opposite.

As explained so far, in the display apparatus in the present embodiment, it turns out that, basically, the tone-voltage generating unit consumes the power only during the time-periods during which the displayed screen or screens is or are being driven. Consequently, it becomes possible to expect an effect of reducing the power consumption at the tone-voltage generating unit.

Figure 11:
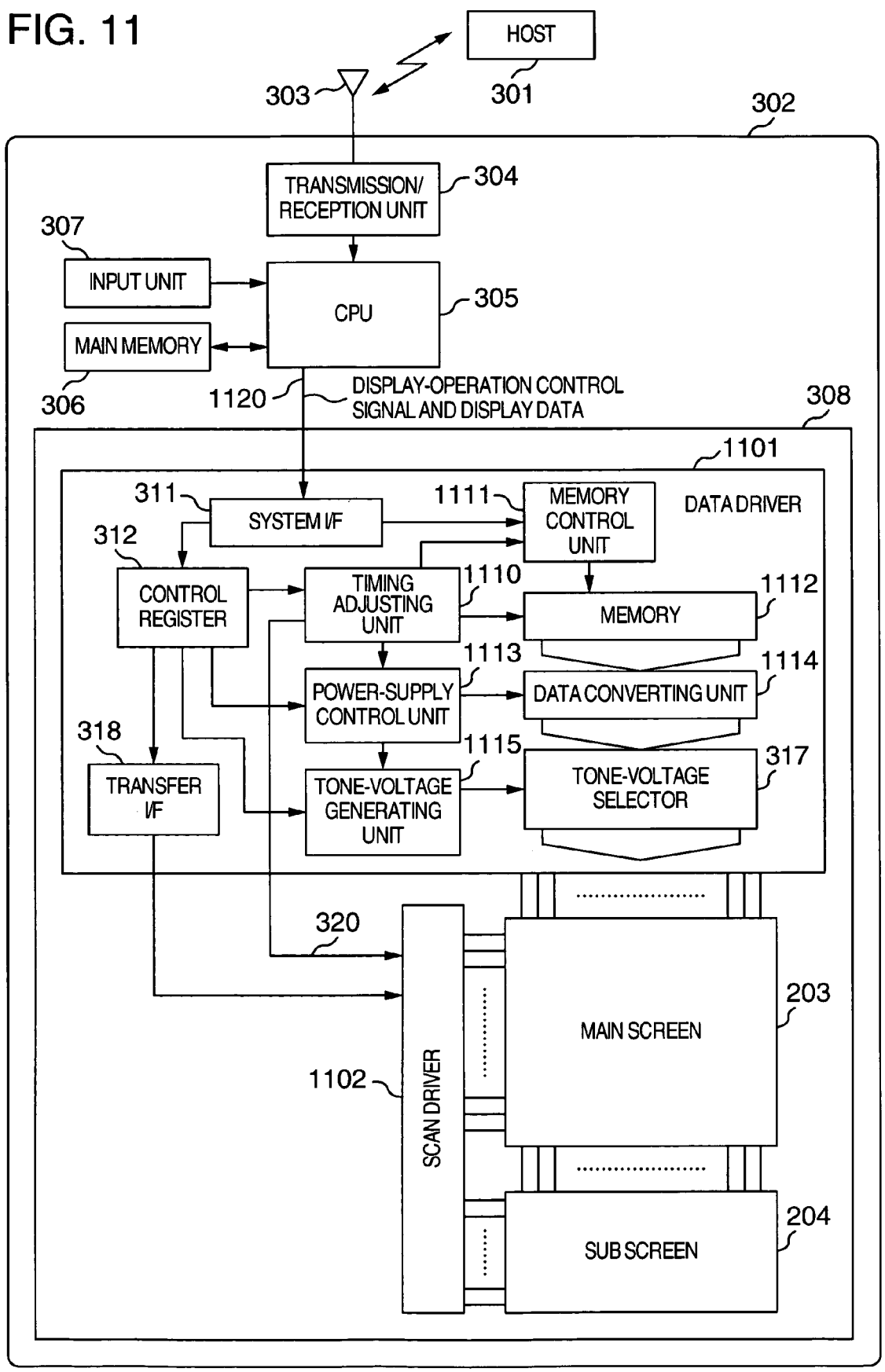
FIG. 11 illustrates a circuit configuration of the display apparatus in the second embodiment of the present invention.
Figure 12:
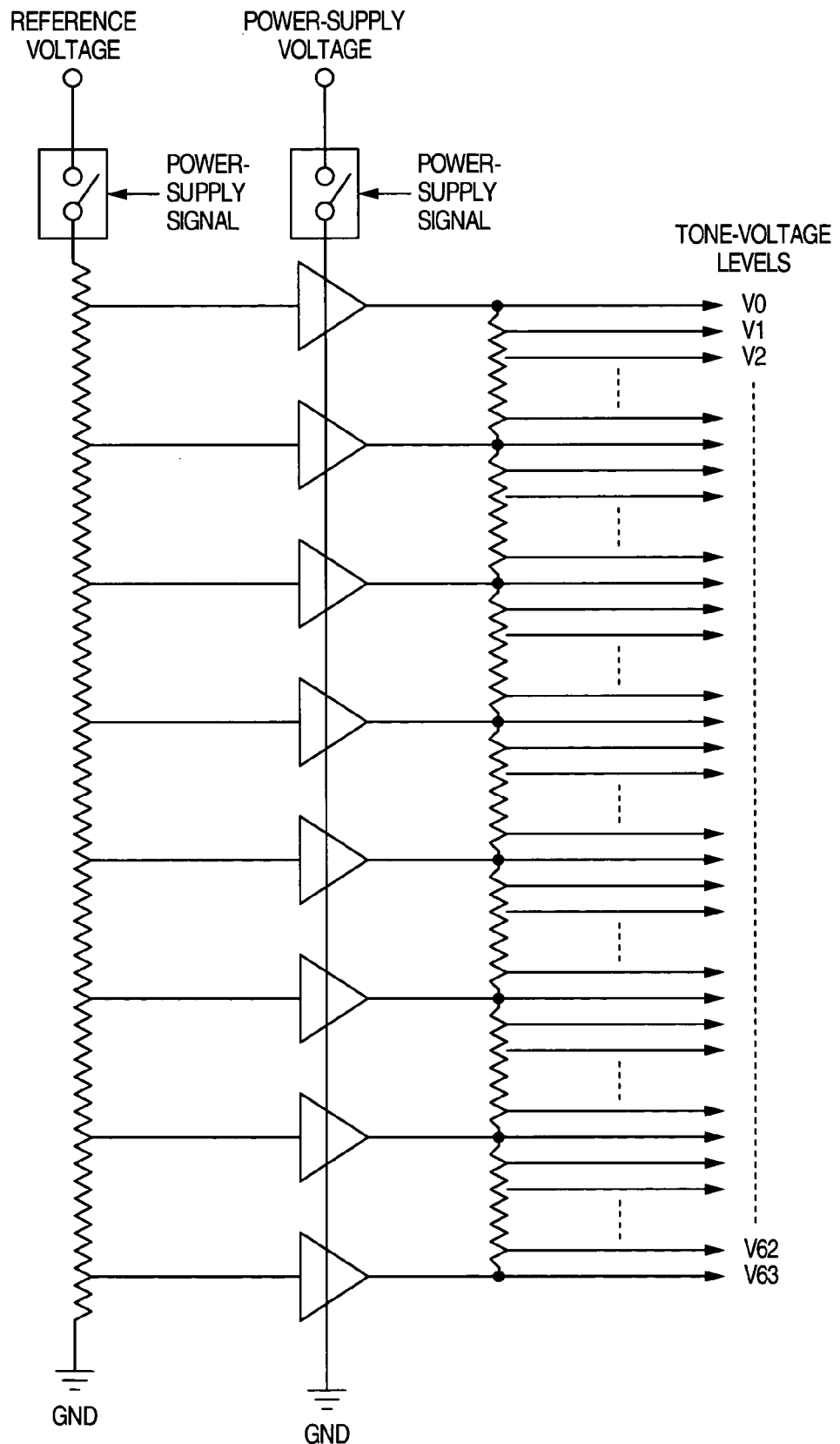
FIG. 12 illustrates a circuit configuration of a tone-voltage generating unit 1115 in the second embodiment of the present invention.

FIG. 11 illustrates a configuration diagram in the case where the display apparatus in the second embodiment of the present invention is applied to a mobile telephone. In FIG. 11, the reference numerals denote the following configuration blocks, respectively: 1101 a data driver, 1102 a scan driver, 1110 a timing generating unit, 1111 a memory control unit, 1112 a memory, 1113 a power-supply control unit, 1114 a data converting unit, 1115 the tone-voltage generating unit, and 1120 a display-operation control signal and display data. The other configuration blocks are the same as those in the first embodiment of the present invention, and accordingly are denoted by the same numerals.

At first, the main modified point in the data driver 1101 is that, instead of being given the display synchronization signals from the CPU, the data driver 1101 internally generates FLM and CL3 by itself. The reason for this is as follows: If the display synchronization signals are given from the outside, there occur some limitations, e.g., the vertical blanking time-periods become necessary by the amount of several lines of the sub screen, thereby complicating the control. Incidentally, using "the system interface" described in the first embodiment of the present invention, the display data is transferred from the CPU, then being stored into the memory 1112. Also, the memory 1112 is provided with a capacity capable of storing both the main screen and the sub screen. This makes it possible to deal with both the two-screen simultaneous display and the one-screen displays even if no display data is transferred from the outside.

At first, the timing generating unit 1110 is a block for internally generating FLM and CL3 described above and RST and CL1, i.e., the memory read control signals. The contents of these signals are basically the same as those in the first embodiment of the present invention. Also, when internally generating the signals, its easiest method is that an oscillator is built in the timing generating unit and its output is frequency-divided thereby to generate the signals.

The memory control unit 1111 performs operations of writing, at a predetermined address, the display data provided from the system interface 311. The details of these operations will be omitted, since the description thereabout has been given in the previously-mentioned Provisional Specification Rev 0.6 "256-color-display-capable RAM-built-in 384-channel segment driver HD66763". Meanwhile, with respect to read operations, based on RST and CL1 generated at the timing generating unit 1110, the read data RDATA are outputted from the memory 1112 sequentially on one-line amount basis in an order from the data for the main screen to the data for the sub screen. Moreover, when power-supply signals generated at the power-supply control unit 1113 described later are "LOW", the read data are converted into "black data" at the data converting unit 1114, then being transferred to the tone-voltage selector.

Figure 10:
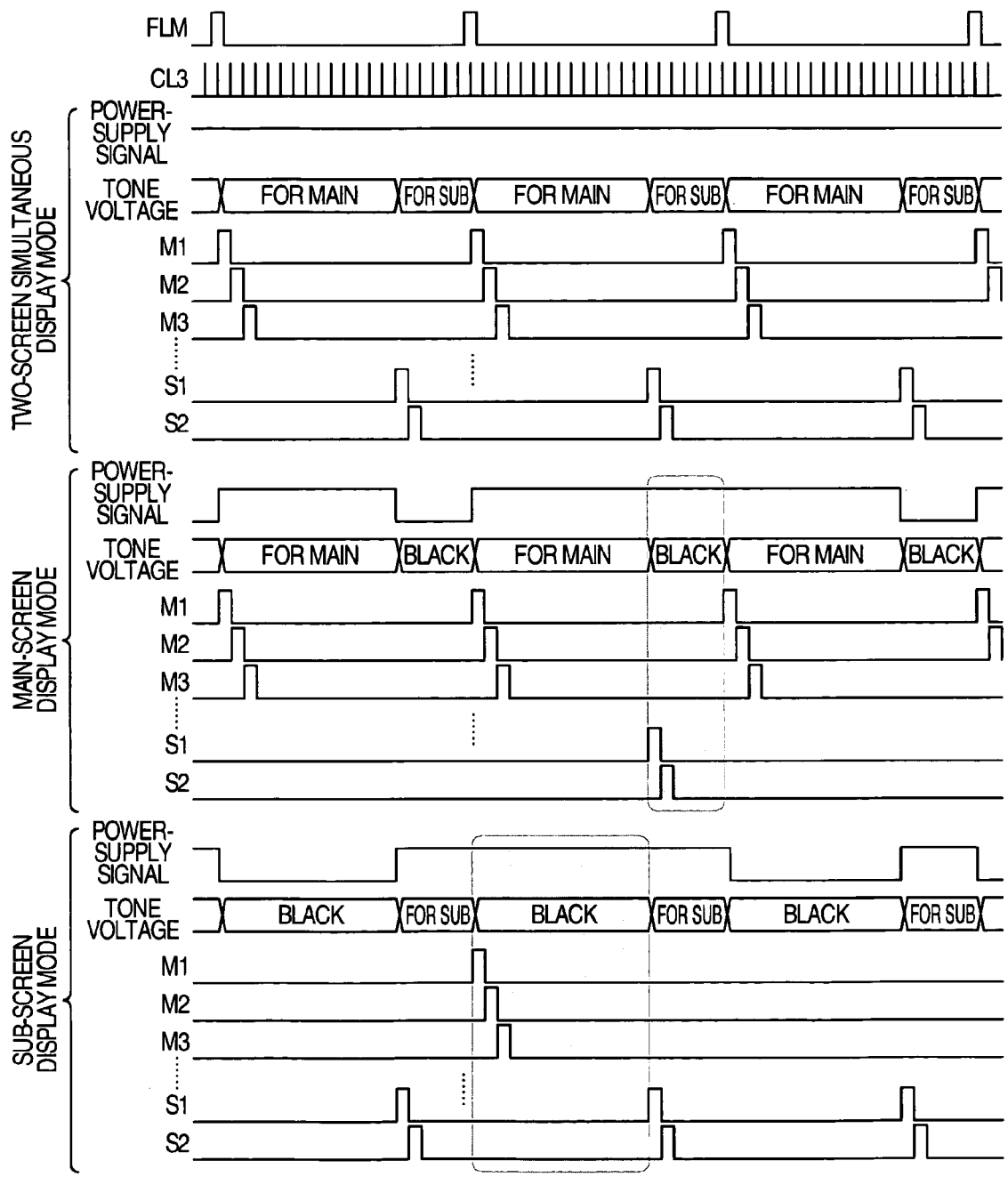
FIG. 10 illustrates operation signals of the display apparatus in a second embodiment of the present invention.

In the respective types of display modes of the main screen and the sub screen, the power-supply control unit 1113 generates and outputs the power-supply signals with the timings indicated in FIG. 10. This operation can be implemented as follows: First, the following information are given to the control register 312 as instructions from the CPU: Information about the line number of the main screen and that of the sub screen, information about the display/non-display operations, information indicating during how many frame time-periods the non-displayed unit is to be driven in the proportion of one time. Next, a logic circuit using these values and RST and CL1 allows the implementation of this operation.

Similarly with the first embodiment of the present invention, the tone-voltage generating unit 1115 is a block for generating tone voltages in a level number corresponding to the display data. For example, as illustrated in FIG. 12, the unit 1115 includes string resistors, operational amplifiers, and switches. As its operation, at first, when the power-supply signals are "HIGH", the switches are turned ON to supply the power to each operational amplifier, thereby generating the plurality of tone voltages. Moreover, when the power-supply signals are "LOW", the switches are turned OFF to stop the power supply to each operational amplifier and direct currents flowing through the string resistors. Consequently, the power consumption at the tone-voltage generating unit 1115 becomes equal to 0. However, when the power-supply signals are "HIGH", the following operation is also allowable instead of supplying the power to all the operational amplifiers: The power is supplied to only an operational amplifier and a string resistor for generating the tone voltage (i.e., lowest voltage) corresponding to the black data, and the power supply to operational amplifiers and string resistors for generating the other tone voltages is stopped.

The configurations and operations of the other blocks are the same as those in the first embodiment of the present invention, and accordingly the explanation thereof will be omitted.

The display apparatus in the second embodiment of the present invention described so far exhibits the effect of allowing the implementation of the low power consumption by extremely lowering the driving frequency of the screen which, of the two screens, is in the non-displayed state. In addition thereto, the display apparatus makes it possible to reduce the power to be consumed at the tone-voltage generating unit.

Incidentally, in the second embodiment of the present invention, "black display" has been selected for the display of the non-displayed screen. The present invention, however, is not limited thereto. For example, if liquid crystal in the normally-white mode is used, applying white data thereto generally results in the lower power consumption.

Also, the second embodiment of the present invention is easily applicable to the so-called partial display mode.

Incidentally, in the second embodiment of the present invention, "black display" has been selected for the display of the non-displayed screen. The present invention, however, is not limited thereto, and an arbitrary image may also be displayed. This display can be easily implemented as follows: Desired image data is stored in advance into a for-non-displayed-screen area in the memory 1112. Then, RDATA to be read therefrom is transferred to the tone-voltage selector just as it is without being converted into "black data", thereby implementing this display. At this time, as the image data for the non-displayed screen, the RGB eight-color display (with no immediate tones used) is desirable where flicker is considered to be unlikely to occur even in the low-frequency driving. Furthermore, in order to implement the RGB eight-color display, it is advisable to operate only operational amplifiers for outputting V0 and V63 in FIG. 12. Accordingly, when the power-supply signals are "LOW", there is provided a unit for cutting operational amplifiers other than the ones for outputting V0 and V63, and stationary currents flowing through the string resistors. This allows the acquisition of the power reduction effect close to the one by "black display".

Also, in the second embodiment of the present invention, the TFT liquid crystal has been used as the screens. The present invention, however, is not limited thereto. Namely, the present invention is applicable to the other types of screens, e.g., an organic EL screen.

Also, in the second embodiment of the present invention, the display synchronization signals have been generated inside the apparatus. The present invention, however, is not limited thereto. Namely, the present invention can also be implemented by generating basically the same signals outside the apparatus, and by transferring the signals thus generated.

Moreover, it is of course possible to simultaneously implement both the functions in the first display apparatus of the present invention and the ones in the second display apparatus thereof.

According to the present invention, in the display apparatus where the separated two screens are driven using the data lines common thereto, when setting either of the two screens into the displayed state, it is possible to extremely lower the scanning frequency of the other non-displayed screen. This allows the implementation of the low power consumption. Also, the scanning pulses for the non-displayed screen driving are generated from the display signals for the displayed screen which are transferred from the outside apparatus. This makes unnecessary a special control to be performed over the outside apparatus, thereby resulting in an excellent ease-to-use characteristic.

Furthermore, according to the present invention, it is possible to set the driver into the operation state only during the time during which the displayed screen is being driven. This allows the implementation of the low power consumption inside the driver as well.

According to the present invention, the tone voltage corresponding to the black data or the white data is applied to the display panel set in the non-displayed state. This makes it possible to prevent deteriorations in the display elements.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A display apparatus including a plurality of display panels, comprising:
   a data driver which applies a tone voltage to display elements of said display panels, said tone voltage corresponding to display data from an outside processor, and
   a scan driver which selects, on each line basis of said display panels, said display elements to which said tone voltage should be applied, wherein
   said data driver is common to said plurality of display panels, and wherein
   said data driver applies said tone voltage to display elements of some of said plurality of display panels, said tone voltage corresponding to said display data from said outside processor, and further applies a tone voltage to display elements of the other display panels of said plurality of display panels during a vertical blanking time-period of some of said plurality of display panels, said tone voltage corresponding to black data or white data.

2. The display apparatus according to claim 1, wherein said data driver comprises:
   a generation circuit for generating a plurality of tone voltages,
   a selector for selecting said tone voltage from among said plurality of tone voltages, and applying said selected tone voltage to said display elements of said display panels, said tone voltage corresponding to said display data from said outside processor, and
   a conversion circuit for converting said display data from said outside processor into said black data or white data, and outputting said black data or white data to said selector during said vertical blanking time-period of some of said plurality of display panels.

3. The display apparatus according to claim 1, wherein said scan driver selects said display elements of said other display panels by using a scanning pulse whose frequency is lower than that of a scanning pulse for selecting said display elements of some of said plurality of display panels.

4. The display apparatus according to claim 1, wherein said scan driver selects said display elements of some of said plurality of display panels on one scanning time-period basis of some of said plurality of display panels, and further selects said display elements of said other display panels on each vertical blanking time-period basis of some of said plurality of display panels.

5. The display apparatus according to claim 1, wherein said data driver comprises:
- a generation circuit for generating a plurality of tone voltages, and
- a selector for selecting said tone voltage from among said plurality of tone voltages, and applying said selected tone voltage to said display elements of said display panels, said tone voltage corresponding to said display data from said outside processor, wherein
- said generation circuit stops an inside circuit during said vertical blanking time-period of some of said plurality of display panels, and wherein
- said inside circuit is used for generating, of said plurality of tone voltages, tone voltages other than said tone voltage corresponding to said black data or white data.

6. The display apparatus according to claim 1, wherein said data driver comprises a generation circuit for generating a plurality of tone voltages, and wherein
- the whole or a part of said generation circuit is stopped during a time-period during which said scan driver has not selected said display elements of said plurality of display panels.

7. A display apparatus including a plurality of display panels, comprising:
- a data driver for applying a tone voltage to display elements of said display panels, said tone voltage corresponding to display data from an outside processor, and
- a scan driver for selecting, on each line basis of said display panels, said display elements to which said tone voltage should be applied, wherein said data driver applies said tone voltage to display elements of some of said plurality of display panels, said tone voltage corresponding to said display data from said outside processor, and
- applies a tone voltage to display elements of the other display panels of said plurality of display panels during a vertical blanking time-period of some of said plurality of display panels, said tone voltage corresponding to predetermined display data which differs from said display data from said outside processor.

8. The display apparatus according to claim 7, wherein said data driver is common to said plurality of display panels.

9. The display apparatus according to claim 8, wherein said data driver comprises:
- a generation circuit for generating a plurality of tone voltages,
- a selector for selecting said tone voltage from among said plurality of tone voltages, and applying said selected tone voltage to said display elements of said display panels, said tone voltage corresponding to said display data from said outside processor, and
- a memory for storing said predetermined display data which differs from said display data from said outside processor, wherein
- said selector selects said tone voltage from among said plurality of tone voltages during said vertical blanking time-period of some of said plurality of display panels, said tone voltage corresponding to said predetermined display data stored in said memory.

10. A display apparatus including a plurality of display panels, comprising:
- a generation circuit for generating a plurality of tone voltages;
- a selector for selecting a tone voltage from among said plurality of tone voltages, and applying said selected tone voltage to display elements of said display panels, said tone voltage corresponding to display data from an outside processor; and
- a scan driver for selecting, on each line basis of said display panels, said display elements to which said tone voltage should be applied, wherein
- said selector applies said tone voltage to display elements of some of said plurality of display panels, said tone voltage corresponding to said display data from said outside processor, and applies a tone voltage to display elements of the other display panels of said plurality of display panels, the luminance of said tone voltage being relatively low of said plurality of tone voltages, and wherein
- said scan driver selects said display elements of said other display panels during a vertical blanking time-period of some of said plurality of display panels.

11. A display apparatus including a plurality of display panels each of which is divided into a plurality of display areas, said display apparatus comprising:
- a data driver for applying a tone voltage to display elements of said display panels, said tone voltage corresponding to display data from an outside processor, and
- a scan driver for selecting, on each line basis of said display panels, said display elements to which said tone voltage should be applied, wherein
- said data driver is common to said plurality of display panels, and applies said tone voltage to display elements of some of said plurality of display areas, said tone voltage corresponding to said display data from said outside processor, and further applies a tone voltage to display elements of the other display areas of said plurality of display areas, said tone voltage corresponding to black data or white data, and wherein
- said scan driver selects said display elements of said other display areas during a vertical blanking time-period of some of said plurality of display areas.

* * * * *